United States Patent
Kreiselmaier

Patent Number: 6,117,242
Date of Patent: *Sep. 12, 2000

[54] DEVICE FOR INTERNAL COATING OF PIPES

[76] Inventor: Richard Kreiselmaier, Von-Braun-Strabe 23, 46244 Bottrop, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/875,517

[22] PCT Filed: Nov. 28, 1995

[86] PCT No.: PCT/EP95/04674

§ 371 Date: Mar. 2, 1998

§ 102(e) Date: Mar. 2, 1998

[87] PCT Pub. No.: WO97/19758

PCT Pub. Date: Jun. 5, 1997

[51] Int. Cl.[7] ........................ B05C 5/02
[52] U.S. Cl. ............. 118/712; 118/306; 118/317; 118/DIG. 10; 134/166 C; 134/167 C; 134/168 C
[58] Field of Search ............ 118/DIG. 10, 306, 118/317, 323, 712; 134/166 C, 167 C, 168 C, 24; 239/DIG. 13; 138/93; 427/140, 236, 421

[56] References Cited

U.S. PATENT DOCUMENTS

| | | | |
|---|---|---|---|
| 3,104,671 | 9/1963 | McLean | 118/DIG. 10 |
| 3,937,404 | 2/1976 | Johnson | 134/167 C |
| 3,987,963 | 10/1976 | Pacht | 118/306 |
| 4,083,384 | 4/1978 | Horne et al. | 138/93 |
| 4,913,089 | 4/1990 | Atkins et al. | 118/317 |
| 4,981,524 | 1/1991 | Waite | 134/24 |
| 5,176,869 | 1/1993 | Okamoto et al. | 118/DIG. 10 |
| 5,235,718 | 8/1993 | Grimsley et al. | |
| 5,307,866 | 5/1994 | Weigel | |

FOREIGN PATENT DOCUMENTS 42 11 146  10/1993  Germany .

*Primary Examiner*—Laura Edwards
*Attorney, Agent, or Firm*—Fulbright & Jaworski L.L.P.

[57] ABSTRACT

An apparatus for coating the inside of pipes An apparatus for coating the inside of pipes, in particular the coolant pipes of steam condensers and heat exchangers with plastics, having a supply unit (V) for bringing up and passing on coating material, an application unit (A) for applying the coating material brought up by the supply unit, and a control unit for monitoring and controlling the supply of coating material and the discharge of coating material on the inside walls of pipes, the application unit (A) having a guide tube (21) with a nose piece (29) to be mounted on the pipe to be coated and an application tube (18) with an application nozzle (30), said application tube being guided within the guide tube (21) and adapted to be introduced into the pipe to be coated through the nose piece (29).

14 Claims, 3 Drawing Sheets

DEVICE FOR INTERNAL COATING OF PIPES

CROSS-REFERENCES TO RELATED APPLICATIONS

Not Applicable

BACKGROUND OF THE INVENTION

1. Field of the Invention

This invention relates to an apparatus for coating the inside of pipes, in particular the coolant pipes of steam condensers and heat exchangers with plastic mixtures.

2. Description of Related Art Including Information Disclosed under 37 CFR 197 and 1.98

It is known to provide steam condensers, as are used for example in plants for producing electric energy, with a plastic coating to counteract corrosion signs, in particular erosion. Pipe bottoms and the coolant pipes issuing therefrom are exposed to a great number of external influences, in particular mechanical, chemical and electromechanical stresses.

Mechanical stresses result from solid particles, for example sand, entrained by the coolant. Furthermore, the temperature difference between the cooling medium and the steam to be condensed, which can exceed 100° C., causes expansion which leads to mechanical stress in particular in the roll-in area of the coolant pipes.

Chemical stresses result from the nature of the cooling medium, for example its load of salts, basic or acidic substances. One might mention in particular the known corrosion effect of sea water used for cooling purposes or heavily polluted river water.

Electrochemical or galvanic corrosion involves that which occurs through the formation of galvanic elements on metallic boundary surfaces, in particular at the transitions from pipe bottom to coolant pipe, and which is greatly promoted by electroconductive liquids, e.g. sea water.

Moreover, the operability of steam condensers is impaired by the deposition of undesirable substances, alga formation, etc., which is promoted in particular by roughness as arises through corrosion signs. This means that corrosion and deposition signs speed up as the service life of a steam condenser increases, because more and more starting points for corrosion and deposits form.

One therefore began early to provide steam condensers with an anticorrosive coating of plastic materials. One uses in particular thick coatings of epoxy resin.

At first only the pipe bottoms themselves were mainly coated, which does not solve the special problems involved in the formation of corrosion signs and deposits in the pipes. Later the pipe inlets and outlets were also included in the coating to protect the especially endangered transitional area. Measures of the abovementioned type are known for example from GB-A-1 125 157, DE-U-1 939 665, DE-U-7 702 562, EP-A-0 236 388 and EP-A-94 106 304.

However it has turned out that only complete coating of the coolant pipes as well can ensure long-lasting corrosion prevention and a long service life. Coating the inside of such coolant pipes is a great problem, however, because of their sometimes considerable length and their small diameter, in particular considering that the coating must be extremely uniform in order to create few starting points for deposits and corrosion signs. At the same time it must be possible to provide the coating in situ and in a very short time in order to minimize the plant down-time. In view of the great number of coolant pipes in steam condensers, which include several thousand pipes, this means that the coating method must be largely automated and standardized.

BRIEF SUMMARY OF THE INVENTION

In view of the problems shown above, the invention is based on the problem of proposing an apparatus for providing coolant pipes with a highly uniform coating very quickly.

This problem is solved by an apparatus for coating the inside of pipes, in particular the coolant pipes of steam condensers with plastic mixtures, having a supply unit for bringing up and passing on coating material, an application unit for applying the coating material brought up by the supply unit, and a control unit for monitoring and controlling the supply of coating material and the discharge of coating material on the inside walls of pipes, the application unit having a guide tube with a nose piece to be mounted on the pipe to be coated and an application tube with an application nozzle, said application tube being guided within the guide tube and adapted to be introduced into the pipe to be coated through the nose piece.

The inventive apparatus is especially designed for quick, uniform and largely standardized coating of the inside of coolant pipes. The invention makes it possible to provide the suitably cleaned and prepared pipes with a plastic coating successively, whereby maximum coating times of a few minutes per pipe are possible at pipe lengths of several meters. It is also readily possible to coat pipes only partly, for example in the end areas, or to apply several layers of different material, for example in the form of a primer, a main layer and a cover layer.

The application tube is expediently adapted to be run out and back at a predetermined rate through the guide tube over its entire length and thus also the entire length of the pipe to be coated. For high-pressure applications the tube should have the necessary pressure resistance; it also requires sufficient stiffness to guarantee its running out into the pipe to be coated, but this is generally given in pressure-proof tubes.

The inventive apparatus is expediently designed for airless gun spraying, the application tube and spray nozzle being designed accordingly. The spray nozzle should be designed in such a way that the application of the coating material takes place in run-back operation in order to guarantee flawless coating not impaired by traction or slide marks. To maintain a uniform distance from the wall one can provide distance pieces in the area of the spray nozzle. For coating, the nozzle expediently produces a hollow cone of spray material directed to the wall at a suitable angle.

To facilitate the handling of the inventive apparatus and in particular the application tube, a hand gun is preferably located at the end of the guide tube, being connected with the guide tube via a swivel joint and mounted on the nose piece. The hand gun can be used to press the nose piece against the pipe end so that the application tube guided through the center of the nose piece can enter directly into the pipe. To adapt to the pipe opening the nose piece is expediently of rounded or oval design, which facilitates centering, on one hand, and adaptation to pipes of different width, on the other hand. The nose piece connected with the hand gun serves simultaneously as a distance piece and a fixed point for the application tube, which is run into the pipe over the particular predetermined length.

A fine filter is preferably located in the application tube, in particular in the immediate vicinity of the spray nozzle, for preventing the nozzle from being clogged by particles, as well as a check valve for interrupting the flow of material without any great delay to prevent coating material from continuing to flow at the end of application.

The hand gun expediently has a functional control unit for providing at least the operating commands, i.e. at least for starting the run-out and run-back processes for the application tube and at least for starting the application process. However, it is at the same time expedient to provide the functional manual control unit with a switch-over from automatic to manual operation so one can control the entire coating process manually in special cases.

The inventive apparatus is designed for coating under high pressure, for example for an operating pressure of 5 to 500 bars and in particular one from 10 to 250 bars. This means that all functions and lines from the suction pump to the spray nozzle must be designed for such pressure; the components required for this purpose are known and commercially available.

In the area of the supply device a coarse filter is expediently located in a suction port or tube for delivering the coating material sucked from a supply container free from coarse particles. The feed pump is expediently a counterpressure-dependent piston pump which ensures material feed as long as spray material is discharged. The piston pump simultaneously builds up the application pressure necessary for operating the apparatus.

In the further course of the material transport from the feed pump to the spray nozzle there is expediently a check valve together with a double-connected filter device for further filtering the coating material. Two filter devices are thereby connected in parallel and provided with pressure difference monitoring means, which can serve as a soiling indicator. The pressure difference is monitored via the control unit, which expediently also indicates the values and, using a measuring cell, monitors the flow of material and controls the connection of the filters. The flow of material can thus be guaranteed over a long time and a clogging of the filters discovered and indicated so early that one can finish a coating process properly and need not discontinue it prematurely.

Obviously the individual components of the inventive apparatus are secured on all sides by cocks, expediently ball valves, so that the components can be replaced at short notice.

From the supply unit with the filter units and the measuring cell the material supply unit leads via a pressureproof tube directly to the application unit in which the application tube is expediently wound on a drum. The drum can be operated by an electric motor, which is in turn operated by the control unit via commands. Depending on the operating state the application tube is wound off the drum or onto the drum, thereby entering a guide tube directly on the drum.

The third unit of the inventive apparatus is a control unit for monitoring, controlling and indicating in particular the sucked/discharged quantities and the pressure. The control unit ensures the operability of the plant and smooth running. It is expediently programmable with regard to feed length, feed rate and run-back rate of the application tube, and also with regard to spray rate and discharged quantity, whereby the program can be stopped by the operator and the plant switched over to manual operation, as stated above. Upon a switch-over to manual operation the central monitoring units remain in service, i.e. the monitoring and control of the suction/discharge process and the operating pressure.

In particular the possibility of programming the feed length of the application tube and its run-back rate in combination with the discharge of material permits great numbers of coolant pipes to be coated quickly and reliably in a standardized manner.

The inventive apparatus is preferably of mobile design so that it can be easily moved to the place of employment and brought into position there. It is expedient to combine the control and supply units into one moving unit which is connected via a pressure-proof supply tube with the application unit and optionally a cable connection with the manual control. The supply tube between control/supply unit and application unit can have any desired length. This makes it possible to operate the relatively sensitive control/supply unit a certain distance away from the application unit, which can be expedient in order to save space but also to protect the more sensitive parts of the plant.

BRIEF DESCRIPTION OF THE SEVERAL VIEWS OF THE DRAWINGS

The invention will be explained more closely through the enclosed figures, in which:

FIG. 4 is a cross-sectional schematic view of the application tube of the unit, showing a filter element and a check valve therein.

DETAILED DESCRIPTION OF THE INVENTION

Figure 1:
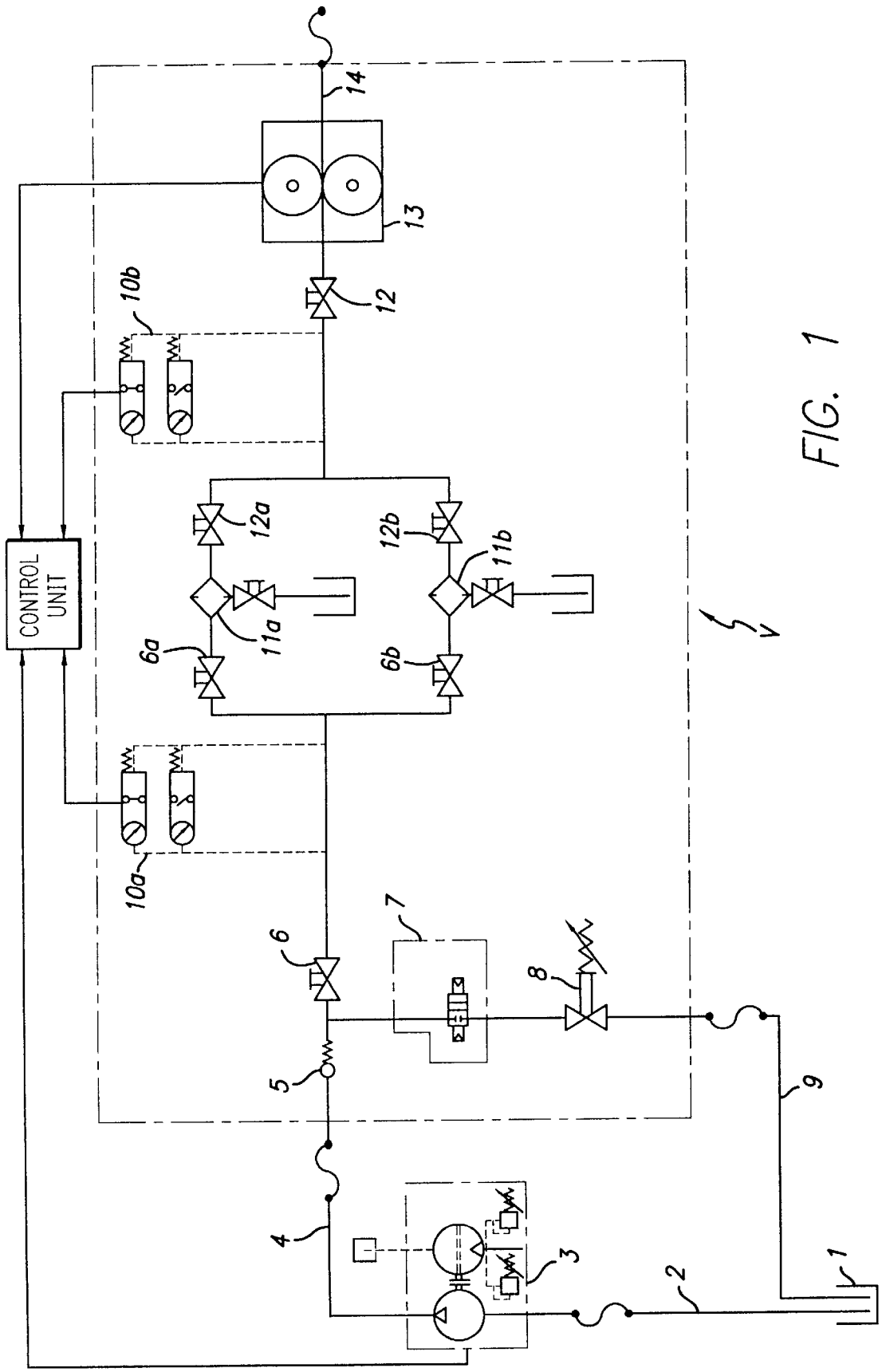
FIG. 1 shows the fluid circuit diagram of the supply unit.

According to FIG. 1 supply unit V comprises suction tube 2 for sucking the coating material to be delivered from receiving vessel 1 by means of pump 3. Tube 2 does not have to be pressure-proof and has a diameter of 19 mm for example.

Pump 3 is expediently an air-operated double-acting piston pump for both sucking and delivering material under pressure. The pump works automatically in counterpressure-dependent fashion, i.e. the material delivery takes place only when spray material is discharged or removed, e.g. through triggering of the coating process. An output of for example 27 1/min at 0 bars is sufficient; a pressure of up to 500 bars is readily achievable.

The piston pump feeds the delivered material via pressure-proof line 4 with a diameter of for example 10 mm via check valve 5 and ball valve 6 of double filter unit 11a/11b. Between check valve 5 and ball valve 6 there is return line 9 which leads back to the material receiver via pneumatic ball valve 7 and back pressure control aggregate 8 with a pressure controller.

Double filter unit 11a/11b is framed by two pressure sensors 10a/10b which permit pressure difference monitoring via the central control unit. The pressure difference monitoring is regularly intended as a soiling indicator for the filters, so that when one filter clogs one can switch over to the other in time and also take early measures for finishing a coating process properly. The filter units can be replaced with no problem by operating ball valves 6a/12a and 6b/12b. Commercial measuring cell 13, for example a toothed wheel measuring cell or an ultrasound measuring cell, allows reliable measurement, monitoring and presentation of the flow of material in the central control unit, which obtains the data necessary for controlling the coating process by evaluating the differential pressure measurement, the measured values from the measuring cell and the output of pump 3.

Figure 2:
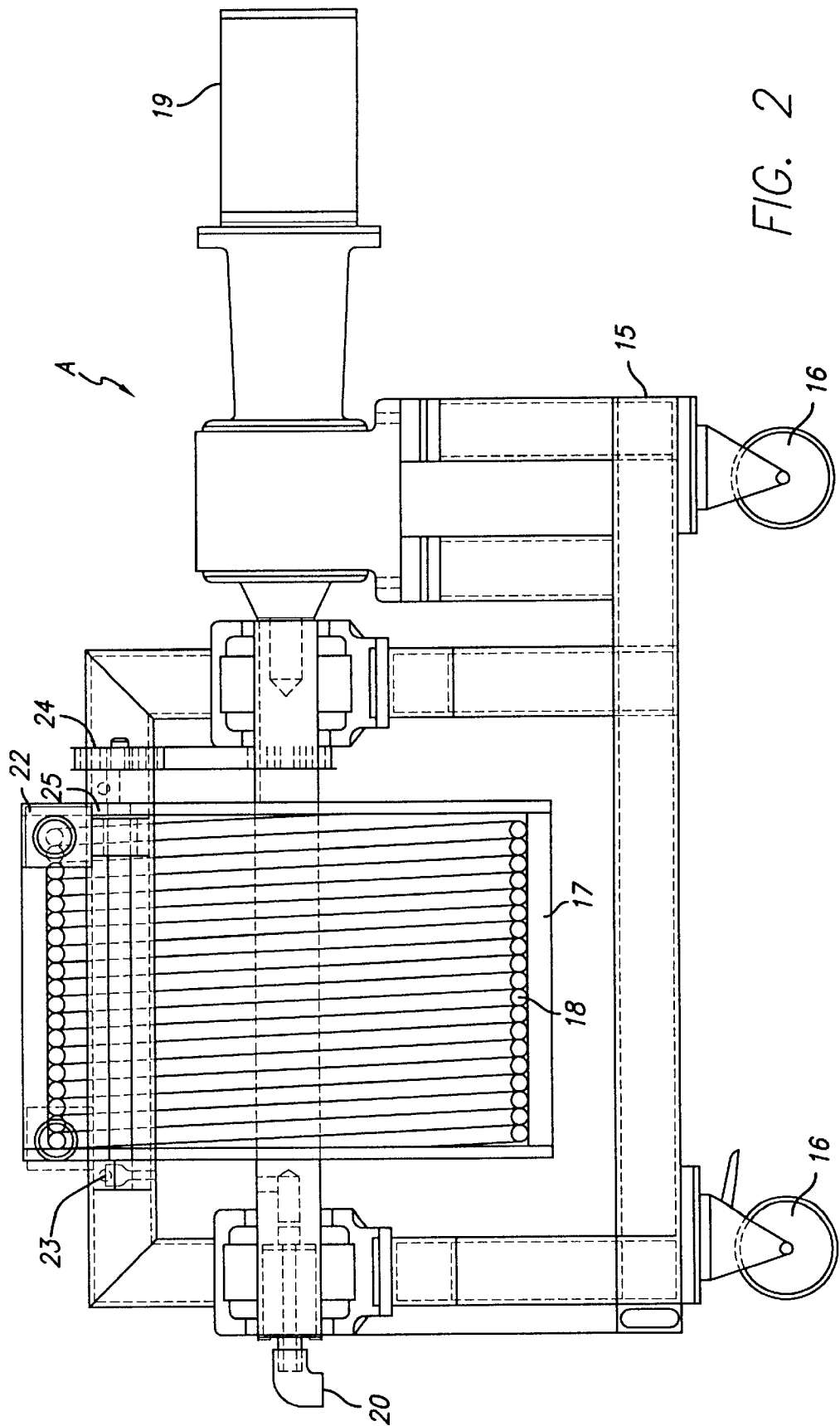
FIG. 2 shows the application unit.

From measuring cell 13 the delivered material passes via line 14 to application unit A according to FIG. 2.

Application unit A is disposed on dolly 15 provided with rolls 16. Drum 17 mounted on dolly 15 receives application tube 18 which can be wound on and off with the help of motor 19. The control and supply unit V and the application unit A are disposed on seperate dollies 15 interconnected by a material supply tube 14. Material is supplied via feed port 20 to which tube 14 of the supply device is connected. From connecting port 20 the material passes via a rotary joint into application tube 18 and from there on to the application nozzle.

Figure 3:
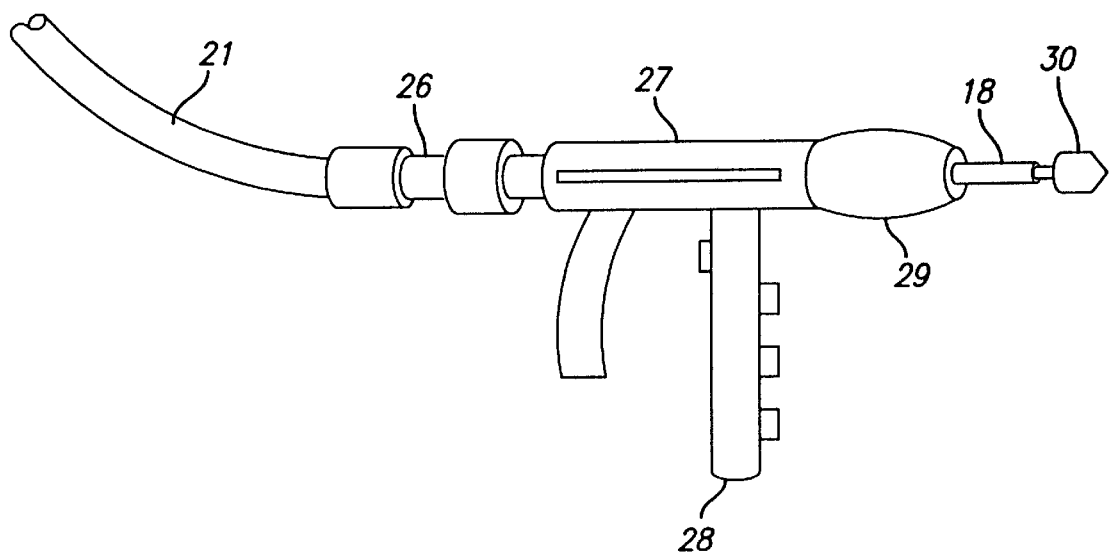
FIG. 3 shows a hand gun for the application unit.

Application tube 18 is guided from the drum through guide tube 21 (FIG. 3). The guide tube is located on projection 22 in the upper area of drum 17, which is guided by means of slides on fixed guide device 23 so that it can follow the windings of the application tube in the horizontal direction when application tube 18 is wound on and off. Drive 24 which is coupled with motor 19 moves guide slide 25 with guide tube projection 22 in synchronism to the winding-off or winding-on process. The winding-off or winding-on process can be ended by limit switches located at the ends of guide device 23.

FIG. 3 shows the actual application apparatus with guide tube 21 connected via swivel joint 26 to hand gun 27. Hand gun 27 has a functional manual control which is disposed on separate handle 28 and has the functions "automatic control", "tube manually forward", tube manually back" and "spraying manually on". At the front end of the hand gun there is oval nose piece 29 which is mounted on the pipe end. The end of application tube 18 protrudes from a central opening, the tube itself ending in spray nozzle 30. The application tube 18 in the area of the spray nozzle 30 includes a filter element 31 and a check valve 32.

Beyond the stated functions the functional manual control on the hand gun can also contain further control elements for influencing the central control.

The inventive apparatus has proven especially suitable for coating relatively long pipes with a small diameter. It has thereby proven expedient to run the application tube at a rate of 0.5 to 5 m/s. Lengths of the application tube of 20 or 30 m are readily possible.

The apparatus is expediently operated at a pressure in the range of 15 to 250.

If the supply and application devices are separate from each other, the distance should be no more than 10 m. The guide tube itself can have a length of up to 10 m, whereby it should be considered that the guide tube length detracts from the working length of the application tube. Apart from a certain smoothness in the inside area, there are no special requirements on the material of the guide tube.

The central control unit monitors the pressure and the entire flow of material in the plant and influences, if necessary, the sucked and discharged quantities of coating material. In addition it is preferable to use the central control device to regulate the run of the application tube, for example with regard to run-out length, run-out rate, run-back rate and release of coating material for application when the end point is reached after the application tube is run out.

In particular the central control unit serves to guarantee a constant flow of material with constant pressure over the necessary time, i.e. also to indicate a possible disturbance in time for the application process to be completed reliably. The differential pressure monitoring was pointed out above, as was the flow monitoring. Also, the onset and end of application of the coating material can be determined both by the central control unit using a predetermined program and by the operator of the hand gun, as can the discontinuance of the application process.

In operation, the in situ device is placed on the cleaned and pretreated pipe by the operator via the hand gun by means of the nose piece, after which the depression of a key causes the application tube with the nozzle to run out into the pipe. The length of the pipe and thus the run-out length is preprogrammed so that the central control unit automatically stops the forward motion. When the end point is reached the coating process together with the return motion of the application tube is triggered either by the central control unit or by the operator, so that the tube moves back to the run-in opening of the pipe at a predetermined rate while delivering a predetermined quantity of coating material. When the nose piece is reached the coating process is discontinued automatically or manually by the operator.

The coating can be applied in several layers, each layer being applied to the still reactive surface of the layer below in order to achieve chemical crosslinking. The inventive apparatus is suitable for multiple coatings in successive operations, whereby one must consider the pot life of the resin being used and the curing time until it is tack-free.

It has sometimes proven expedient to provide the cleaned surfaces with a primer before applying the coating, the primer generally being sprayed on with lower viscosity and penetrating into corrosion hollows and pits. One thus obtains a leveling of the surfaces, better adaptation to unevenness and an altogether better adhesion of the layers. The inventive apparatus can also be used for the primer layer.

Preferred materials for the inventive coating are cold-curing epoxy resins which are processed together with an amine hardener. The inventive apparatus is suitable for transporting and spraying such materials. These resinous compounds contain usual fillers and dyes, set-up agents, stabilizers and other usual additives to ensure the properties desired from them, in particular processibility and durability. One must make sure the particle size of these additives is selected so that they can readily pass the filter devices located in the flow of material. In any case they are usual plastic mixtures as can also be used for other purposes; what is crucial for the inventive apparatus is not so much the type of curing plastic material as rather its corrosion resistance and elasticity after curing. Besides epoxy resins one can also use other cold-curing plastic mixtures which meet these requirements. However, epoxy-amine systems have for some time been preferred for coating condenser tubes.

The coating in the coolant pipes should, if it is not continuous and includes several layers, taper out layer for layer so that the coating gradually flattens out. It is expedient to go further into the coolant pipe and onto the bare metal with the outer layer so that the layer below is completely covered by the one above. The outer layer can also start further outside than the one below. Since the inventive apparatus permits the spray nozzle to be run into the condenser tubes over any desired predetermined length, it is especially suitable for this coating variant.

What is claimed is:

1. An apparatus for coating inside of coolant pipes of steam condensers and heat exchangers with coating material, comprising a supply unit (V) for bringing up and passing on coating material, comprising an application unit (A) for applying the coating material brought up by the supply unit, and a control unit for monitoring and controlling the supply of coating material and the discharge of coating material on inside walls of pipes, the control unit monitoring and regulating sucked/discharged quantities of coating material and operating pressure, and being programmable with regard to feed length, feed rate and/or run-back rate of the application unit (A), the application unit (A) having a guide tube (21) with a nose piece (29) to be mounted on a pipe end to be coated and an application tube (18) with an application nozzle (30), said nose piece (29) serving as a fixed point for the application tube (18) and said application tube being guided within the guide tube (21) and to be run out into and back from the pipe to be coated through the nose piece (29) over a predetermined length of the pipe.

2. The apparatus of claim 1, wherein the application tube (18) is to be run out and back in controlled fashion through the guide tube (21) over the entire length of the pipe to be coated.

3. The apparatus of claim 1 or 2, wherein the application tube (18) is a high-pressure airless spray tube, the application nozzle (30) being an airless spray nozzle designed for application in run-back operation.

4. The apparatus of claim 1, wherein the guide tube (21) ends in a hand gun (27) with the mounted nose piece (29), the hand gun (27) being connected via a swivel joint (26) with the guide tube (21) and the application tube (18) being guided through the hand gun (27) and the nose piece (29).

5. The apparatus of claim 4, wherein the nose piece (29) has a substantially oval shape to be mounted on the end of the pipe to be coated.

6. The apparatus of claim 1, having a filter element and a check valve in the application tube (18) at the application nozzle (30).

7. The apparatus of claim 4 or 5, having said hand gun (27) which has a functional manual control (28).

8. The apparatus of claim 1, wherein it is designed for an operating pressure in the range of 5 to 500 bars.

9. The apparatus of claim 1, wherein the supply unit has a suction tube (2) provided with a coarse filter and connected with a feed pump (3) working in counterpressure-dependent fashion.

10. The apparatus of claim 1 having a material feed (4/14) to the application unit (A) and having a check valve (5) and a double-connected filter device (11a/11b) at material feed (4/14).

11. The apparatus of claim 1, having a motor-driven tube drum (17) for the application tube (18) at the application unit (A).

12. The apparatus of claim 1 wherein the application unit A is disposed on a dolly (15).

13. The apparatus of claim 1, wherein it is designed for an operating pressure in the range of 10 to 250 bars.

14. An apparatus for coating inside of coolant pipes of steam condensers and heat exchangers with coating material comprising a supply unit (V) for bringing up and passing on coating material, comprising an application unit (A) for applying the coating material brought up by the supply unit, and a control unit for monitoring and controlling the supply of coating material and the discharge of coating material on inside walls of pipes, the application unit (A) having a guide tube (21) with a nose piece (29) to be mounted on a pipe end to be coated and an application tube (18) with an application nozzle (30), said nose piece (29) serving as a fixed point for the application tube (18) and said application tube being guided within the guide tube (21) and to be run out into and back from the pipe to be coated through the nose piece (29) over a predetermined length of the pipe, the guide tube (21) ending in a hand gun (27) with the mounted nose piece (29), the hand gun (27) being connected via a swivel joint (26) with the guide tube (21) and the application tube (18) being guided through the hand gun (27) and the nose piece (29).

* * * * *